(12) United States Patent
Johnson

(10) Patent No.: US 8,627,799 B2
(45) Date of Patent: Jan. 14, 2014

(54) INDUCTION AND FUEL DELIVERY SYSTEM FOR PISTON ENGINE

(76) Inventor: David Littlewood Johnson, Ferntree Gully (AU)

( * ) Notice: Subject to any disclaimer, the term of this patent is extended or adjusted under 35 U.S.C. 154(b) by 1077 days.

(21) Appl. No.: 12/600,028

(22) PCT Filed: Nov. 6, 2006

(86) PCT No.: PCT/AU2006/001653
§ 371 (c)(1),
(2), (4) Date: Nov. 13, 2009

(87) PCT Pub. No.: WO2008/049147
PCT Pub. Date: May 2, 2008

(65) Prior Publication Data
US 2010/0192906 A1    Aug. 5, 2010

(30) Foreign Application Priority Data
Oct. 24, 2006    (AU) ................. 2006905892

(51) Int. Cl.
*F02B 31/00* (2006.01)
*F02G 5/00* (2006.01)
*F01N 3/02* (2006.01)

(52) U.S. Cl.
USPC ........... 123/306; 123/301; 123/255; 123/262; 123/263; 123/273; 123/555; 60/320; 701/103

(58) Field of Classification Search
USPC ......... 123/306, 301, 302, 305, 308, 255, 262, 123/263, 273, 274, 275, 277, 281, 285, 288, 123/470, 525, 555, 556, 557; 239/398, 399, 239/402.5, 403, 404, 405; 60/320, 597; 701/103; 236/18
See application file for complete search history.

(56) References Cited

U.S. PATENT DOCUMENTS

| | | | |
|---|---|---|---|
| 2,096,765 A * | 10/1937 | Saha | 110/264 |
| 3,744,250 A * | 7/1973 | Tanasawa et al. | 60/303 |
| 4,047,511 A | 9/1977 | Takagi | |
| 4,106,453 A | 8/1978 | Burley | |
| 5,024,193 A * | 6/1991 | Graze, Jr. | 123/259 |
| 5,067,458 A * | 11/1991 | Bailey | 123/292 |
| 5,392,744 A * | 2/1995 | Regueiro | 123/262 |
| 5,672,187 A * | 9/1997 | Rock et al. | 95/219 |
| 8,479,714 B2 * | 7/2013 | Albert et al. | 123/556 |
| 2003/0217739 A1 | 11/2003 | Saeki et al. | |
| 2007/0202453 A1 * | 8/2007 | Knoepfel | 431/354 |
| 2008/0305445 A1 * | 12/2008 | Roberts et al. | 431/9 |

FOREIGN PATENT DOCUMENTS

| | | | |
|---|---|---|---|
| DE | 2120126 B | * | 9/1980 |
| DE | 3311267 A1 | * | 8/1984 |
| GB | 1474384 | | 5/1977 |
| JP | 56146902 A | * | 11/1981 |

(Continued)

*Primary Examiner* — Stephen K Cronin
*Assistant Examiner* — Raza Najmuddin
(74) *Attorney, Agent, or Firm* — David A. Guerra

(57) ABSTRACT

Apparatus constituting part of an induction and fuel delivery system for a cylinder of a piston internal combustion engine comprising a small cyclone into which is tangentially discharged a flow of heated air to generate a sustained vortex of high rotational speed; a modulatable fuel injector delivering a flow of atomized fuel into said small cyclone wherein it underdoes flash evaporation and energetic mixing; a delivery duct connecting said small cyclone to the inlet tract of said cylinder wherein said vortex fuel-air mixture is mixed with heated induction air; and means to prevent overheating of said modulatable fuel injector.

75 Claims, 4 Drawing Sheets

(56) References Cited

FOREIGN PATENT DOCUMENTS

| | | | | |
|---|---|---|---|---|
| JP | 59147921 A | * | 8/1984 | |
| JP | 60175910 A | * | 9/1985 | |
| JP | 06137225 A | * | 5/1994 | |

* cited by examiner

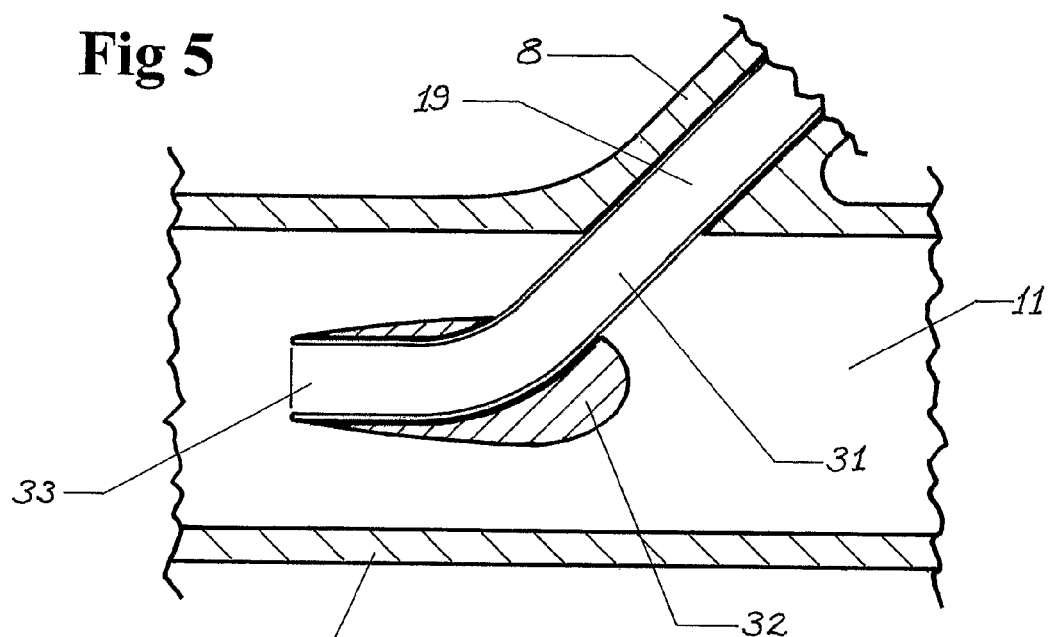
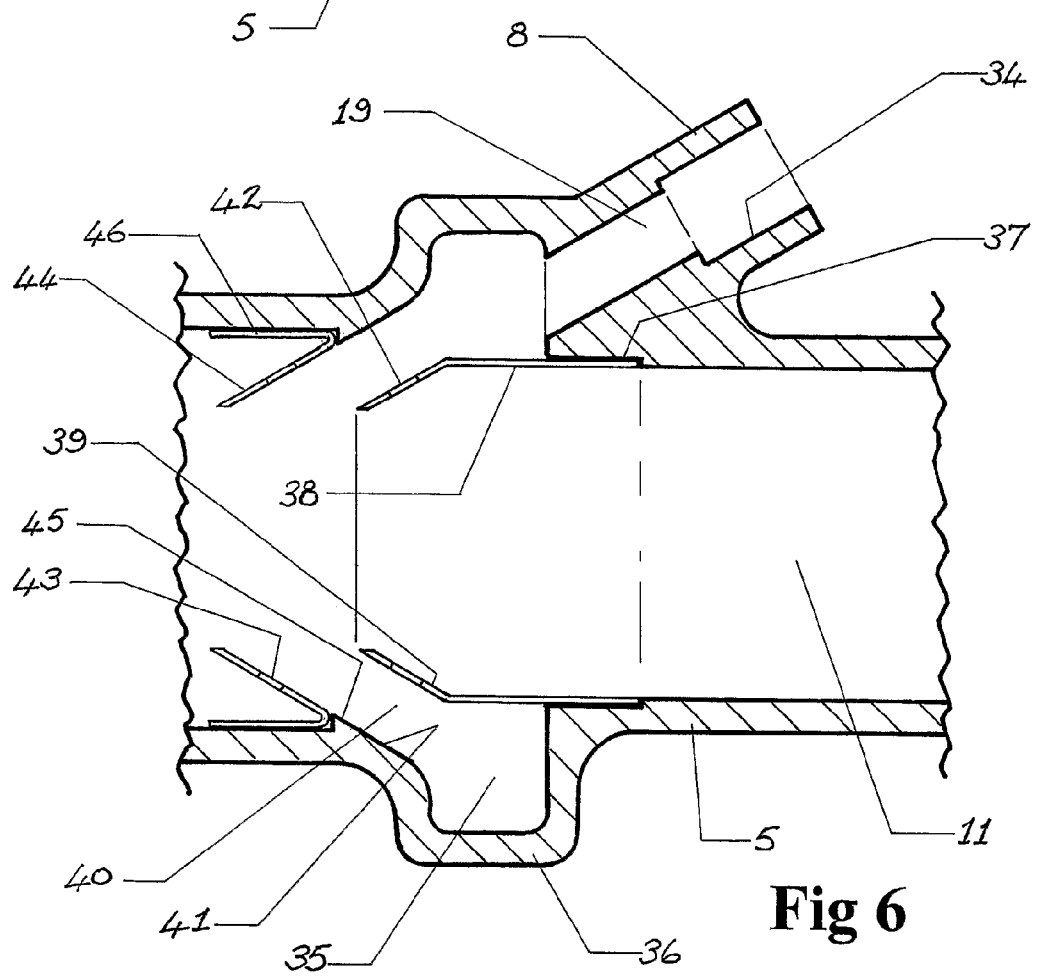

US 8,627,799 B2

INDUCTION AND FUEL DELIVERY SYSTEM FOR PISTON ENGINE

CROSS-REFERENCE TO RELATED APPLICATIONS

This application is an U.S. national phase application under 35 U.S.C. §371 based upon co-pending International Application No. PCT/AU2006/001653 filed on Nov. 6, 2006. Additionally, this U.S. national phase application claims the benefit of priority of co-pending International Application No. PCT/AU2006/001653 filed on Nov. 6, 2006 and Australia Application No. 2006905892 filed on Oct. 24, 2006. The entire disclosures of the prior applications are incorporated herein by reference. The international application was published on May 2, 2008 under Publication No. WO 2008/049147 A1.

BACKGROUND OF THE INVENTION

1. Field of the Invention

This invention relates to methods and apparatus for use in piston internal combustion engines for conditioning the inlet airstream and for conditioning fuel discharged into the inlet airstream.

2. Description of the Prior Art

In the operation of gasoline-fuelled piston internal combustion engines, it is normal practice for fuel to be discharged into the inlet airstream in the form of finely divided liquid droplets. Droplet delivery has the advantage that fuel in this form displaces a minimum of air, thereby making available a maximum of oxygen for combustion of the fuel in the engine cylinder. While some evaporation of the droplet fuel does occur during passage of the mixture through the inlet tract and further evaporation occurs as a result of the temperature rise associated with compression of the charge in the cylinder, part of the fuel may remain in liquid droplet form at the onset of ignition. As ignition is initiated in the vapour content of the charge, it is therefore necessary to provide a greater quantity of fuel in the charge in order to ensure a sufficiently rich vapour mixture for ignition to reliably occur under all operating conditions. In conventionally carburetted engines, lean mixtures are provided for low power operation and additional fuel is released through power enrichment provisions during high BMEPs.

It has been demonstrated that, once a self-propagating flame front has been established in the cylinder, it will reliably propagate throughout the generality of a charge having a much leaner mixture strength than that required for reliable ignition to occur. Many systems have been proposed for exploiting this effect by providing a locally enriched mixture in the ignition region. Such charge stratification methods are well known in the art, but have not found favour because of the extra cost and complexity they entail. In some engines, reliability of ignition in lean mixtures has been improved by providing larger, more energetic or multiple ignition sources in each cylinder.

It is also well known in the art that, in engines in which the cylinders are supplied with mixture through a multi-branched inlet manifold, it is difficult to ensure an even distribution. As a result, some cylinders tend to receive a leaner mixture than others, making a compensatory increase in overall mixture strength necessary. Excepting where individual carburettors feed individual cylinders through straight inlet tracts, this effect is common in conventionally carburetted engines. The problem of unequal mixture distribution is not mitigated by throttle box fuel injection arrangements, which retain conventional inlet manifolding provisions.

Inequalities in mixture distribution as a result of inlet tract inadequacies have been commonly overcome by injecting fuel in droplet form directly into the opening of the inlet port, from whence it is entrained in the inlet airflow and carried into the cylinder. While port injection of a quantity of fuel accurately appropriate to the instantaneous operating parameters of an engine does mitigate the unequal mixture distribution problem, there is less opportunity for evaporation of the droplet fuel in the short travel distance involved and some will still remain in droplet form at the onset of ignition. Thus, absent charge stratification or more elaborate ignition provisions, a richer than necessary mixture strength is still required in order to ensure the presence of sufficient fuel in vapour form for the achievement of reliable ignition.

It is well known that diesel engines commonly operate at lambda figures exceeding 1.5. This means that in excess of 150% of the air required for a stoichiometric mixture is supplied to a cylinder. Such high lambda figures are a consequence of the timed injection of droplet fuel employed in the diesel engine and are largely responsible for its excellent fuel economy. In contrast, gasoline-fuelled engines of conventional arrangement seldom exceed lambda figures of 1.1, with lower figures occurring at higher powers. However, it has been shown that, in the same engines, a charge comprising dry gaseous fuels, for example, propane, thoroughly mixed with air to provide an homogenous mixture will provide reliable ignition at lambda figures of 1.3 at relatively high BMEPs and there is evidence that operation up to lambda figures of around 1.5 can readily be achieved.

While separate complete evaporation of gasoline fuel in the manner employed with liquefied petroleum gas fuel is not practical due to difficulties in vaporising certain essential additives contained in fuels such as gasoline, there is evidence that, if gasoline can be fully evaporated in the inlet airstream and thoroughly mixed with the charge air, operation at relatively high BMEPs is achievable at lambda figures similar to the best achievable with dry gaseous fuels. To achieve a high degree of evaporation of droplet fuel prior to entry of the mixture to the cylinder, heating of all or part of the charge air and, in some cases, the fuel, is necessary.

It is conventional belief that, in air breathing engines, charge temperature should be maintained as low as possible to provide the greatest possible charge density, thereby improving volumetric efficiency. It is also believed that the onset of detonation is delayed by maintaining a low charge temperature. It can be demonstrated that high charge temperatures may, in fact, be provided or tolerated with beneficial effect, with volumetric efficiency being restored in various ways and with premature detonation not proving to be a problem.

The advantages of heating fuel and inlet air to achieve substantial evaporation of fuel in the inlet tract of a gasoline-powered piston internal combustion engine have long been recognised and a variety of methods have been proposed for this purpose. Typical of these is that taught by Sviridov et al in U.S. Pat. No. 4,438,750 in which a vaporizing element extends from an exhaust port to an adjacent inlet port. A heat take-up part of the vaporizing element is heated by exhaust gases and heat captured thereby is conducted via a connecting member of the vaporizing element to its curved operating surface situated in the inlet port. Fuel is injected into the inlet port via an electromagnetically-controlled injection nozzle at a tangent to the operating surface to provide better conditions for fuel film forming. A stated object is the vaporisation of injected fuel to accomplish complete homogenisation of an air-fuel mixture before it enters the engine cylinder. Similarly, in methods taught by Scherenberg et al in U.S. Pat. No. 5,140,967 and Jordan in U.S. Pat. No. 3,930,477, a heating bar or element is provided in each inlet port and fuel discharged by a fuel injector into the heated region is subject to accelerated vaporisation. In another example taught by Yokoi et al in U.S. Pat. No. 4,483,304, rapid evaporation of fuel films is achieved by providing electrical resistance-heated fuel vaporizers at various positions within the inlet tracts of an engine. In another example taught by Swanson in U.S. Pat. No. 4,375,799, fuel vaporization means are provided in the form of a vaporization chamber embedded in one wall of a carburettor, the chamber being heated by surrounding electrical heating elements. Fuel is discharged into the vaporization chamber and evaporated before being discharged into the venturi of the carburettor. In another example taught by Oblander in U.S. Pat. No. 3,461,850, the main exhaust manifold runner is made unitary with the inlet manifold runners of an engine, resulting in a heated zone in each runner. Fuel is discharged from a conventional fuel injector onto the heated zone, the stated object being an improvement in fuel preparation. In another example taught by Gardner et al in U.S. Pat. No. 4,583,512, the carburettor or fuel injection system are deleted from an engine and the inlet air and fuel are heated by a series of electrical resistive elements in separate heat exchange units. The heated fuel and air are combined and further heated in a common heat exchange unit and admitted to the combustion chambers of the engine through a series of electrically-operated valves. A stated object, amongst others, is the provision of better fuel vaporisation and fuel to air ratio. In another example taught by Hoppie et al in U.S. Pat. No. 4,664,925, a quantity of fuel is pre-heated by passing it through a coiled tube positioned in each exhaust port. The fuel is vaporised and rapidly heated to a high temperature by being adiabatically compressed immediately prior to injection into the combustion chamber. Stated objects are to achieve negligible ignition delay and substantially instantaneous completion of the combustion process. In another example taught by Lakin in U.S. Pat. No. 6,712,051, part of the inlet air is heated by engine coolant or exhaust system waste heat. The heated air is mixed with ambient air in a computer-controlled temperature regulation system based on the power output required from the engine. A fuel injection system is employed to maintain correct fuel-air ratios over the extended range of combustion air temperatures.

Of the cited examples, the method taught by Sviridov et al requires adjacent inlet and exhaust runners, which is impractical in many engines. Additionally, the temperature of the vaporising element is uncontrolled, resulting in the possible overheating of the vaporizing element in some operating conditions. Similar objections are made to the method taught by Oblander. In the methods taught by Scherenberg et al and Jordan, the flow of inlet air over the heating bar or element would result in rapid cooling, requiring a high electrical current flow to be of any significant effect. The necessary generation of electrical current would result in an adverse effect upon the efficiency and fuel economy an engine. Similar objections are made to the method taught by Yokoi et al. The method taught by Swanson requires use of a carburettor and is therefore considered impractical in light of modern automotive practice. The method taught by Gardner et al requires a high electrical current flow to be of any significant effect and the necessary generation of electrical current would result in an adverse effect upon the efficiency and fuel economy an engine. In the method taught by Hoppie et al, it is difficult to see how cold starting would be achieved. Additionally, basic fuel-air mixture control and the production of an homoge-neous charge strength would present difficulties. The method taught by Lakin would provide minimal benefits in normal operation.

SUMMARY OF THE INVENTION

A first object of the present invention is to improve the fuel economy of piston internal combustion engines by providing means to control the temperature of the inlet airstream and to control the temperature of fuel discharged into the inlet airstream. A second object of the present invention is to provide thorough mixing of the fuel with the inlet airstream, thereby delivering, as nearly as possible, an homogenous fuel-air mixture to each cylinder in an engine and allowing a more efficient burning of the fuel. A third object of the present invention is to provide means of readily modifying existing engine types to achieve the first and second objects stated above.

According to the present invention, in a piston internal combustion engine, liquid gasoline fuel is heated by engine waste heat in suitable heat-exchange means to a temperature approaching its normal boiling point and is maintained in a pressurised state to prevent boiling off. A supply of air is heated by exhaust gases in suitable heat-exchange means to a temperature well above the boiling point of gasoline and the major part of said heated air is mixed with ambient air to provide a flow of heated induction air. The minor part of said heat air is supplied tangentially to a plurality of small cyclones, each of which is associated with one engine inlet manifold runner. Each said small cyclone generates a sustained vortex of high velocity which is discharged into the appropriate inlet manifold runner upstream of the associated inlet valve. The heated fuel is supplied to electronically-controlled fuel injectors provided in each said small cyclone and discharged in atomised form into said vortices of heated air where it undergoes flash evaporation. The heated induction airstream and vortex fuel-air flow combine in the inlet manifold runners before passing to the cylinders of the engine, effectively as an homogenous dry gas.

BRIEF DESCRIPTION OF THE DRAWINGS

The various aspects of the present invention will be more readily understood by reference to the following description of preferred embodiments given in relation to the accompanying drawings in which:

FIG. 5 is a longitudinal cross-sectional view of alternative means to discharge a vortex fuel-air flow into an inlet manifold;

FIG. 6 is a longitudinal cross-sectional view of other alternative means to discharge a vortex fuel-air flow into an inlet manifold;

DETAILED DESCRIPTION OF THE INVENTION

Wherever the word 'gasoline' or words 'gasoline-fuelled' appear throughout this specification, the word 'gasoline' should be taken to mean any liquid fuel capable of being treated in the manner described herein. The meaning of the word 'gasoline' should also be taken to include fuels which may only liquefy in the temperature range 20° to 300° C. Wherever the word 'air' is used throughout this specification, it should be taken to include any admixture in suitable ratio of another gas or gases with oxygen.

Figure 1:
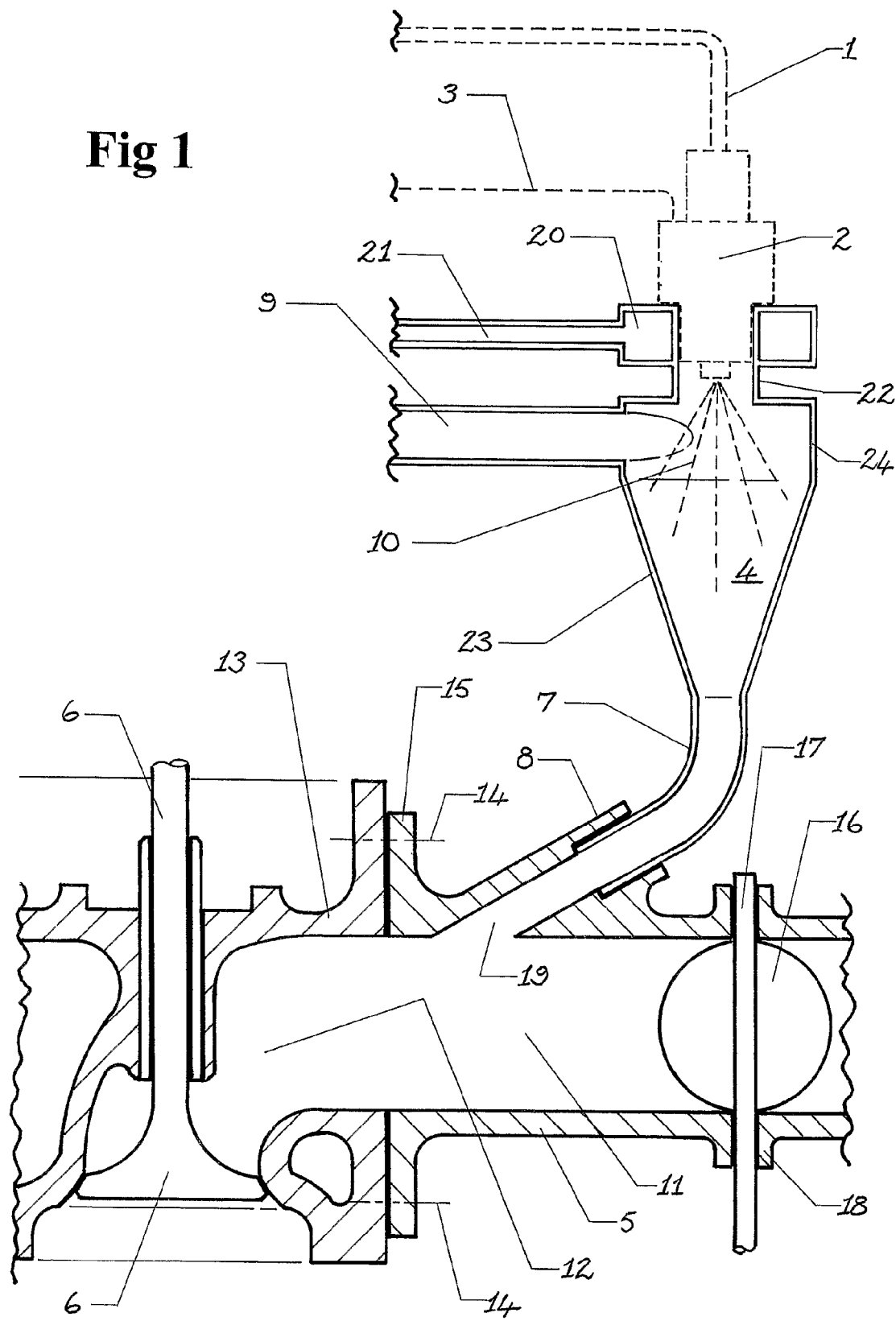
FIG. 1 is a longitudinal cross-sectional view through one inlet manifold runner, inlet port and small cyclone of an engine incorporating the present invention.
Figure 2:
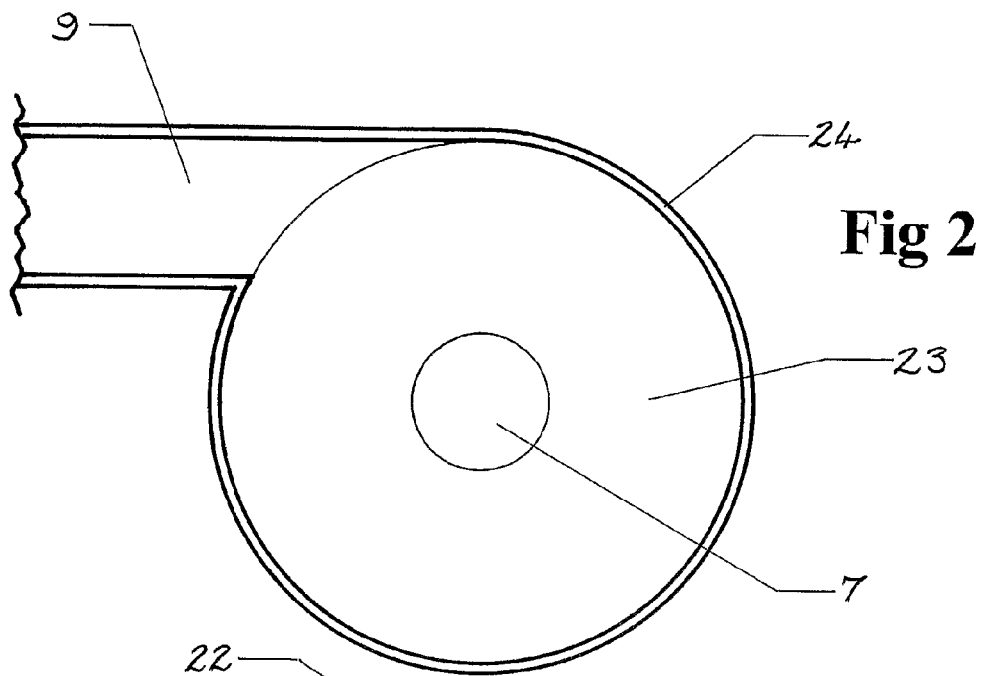
FIG. 2 is a transverse cross-sectional view of a small cyclone of the present invention through a plane passing through the axis of the delivery duct.

With reference to FIGS. 1 and 2, in a piston internal combustion engine, a supply of liquid gasoline fuel is pressurised to injection pressure in a suitable pump (not shown) and heated to an approximate temperature of 85 to 90° C. in suitable heat-exchange means (not shown) using waste heat from the cooling system of said engine, the pressurised state of said fuel preventing its boiling off. In the preferred embodiment, suitable thermostatic control means (not shown) are employed to maintain said heated fuel in the said desired temperature range during normal operation. Said heated fuel is supplied through a suitable fuel supply manifold (not shown) and thence via separate fuel supply lines 1 (position indicated in broken line) to a plurality of electronically-controlled, modulatable fuel injectors 2 (position indicated in broken line), each mounted to and positioned with its fuel spray discharge axis collinear with the longitudinal axis of a small cyclone 4 associated with each engine inlet manifold runner 11. Said small cyclones comprise principally cylindrical part 24 and conical part 23. Suitable fuel return lines (not shown) are provided where required, any return flow being directed to a ready-use reservoir (not shown) from which said fuel pressurising pump obtains a supply of heated fuel. Should said ready-use reservoir become full, overflow is directed to the main fuel storage tank (not shown). Control signals are transmitted to said fuel injectors via electrical conductors 3 (position indicated in broken line). A supply of air is heated by exhaust gases in suitable heat-exchange means (not shown) to a temperature of up to 1,000° C. above ambient and the major part of said heated air is mixed with ambient air to provide a flow of heated induction air at a temperature normally in the range +20° to +100° C. within the inlet manifold runner downstream of throttle butterfly valve 16. Where another fuel is used, said air temperature in said inlet manifold runner is increased as required to be above the dewpoint of said fuel. Said mixing of said heated air and said ambient air is performed in a modulatable, electronically-controlled mixing valve (not shown) which is controlled by a suitable microprocessor-based control unit (not shown) receiving signals from sensors (not shown) sensing the temperature of ambient air, the temperature of said heated air and the temperature of said induction air. Said control unit also receives a signal indicating the position of valving elements of said mixing valve and modulates the position of said valving elements as required to maintain said induction air temperature in the optimum range. Obviously, said modulatable fuel injector may be positioned with its said discharge axis parallel to but laterally displaced from the longitudinal axis of said small cyclone, or displaced laterally and angularly from the longitudinal axis of said small cyclone, including being mounted on and discharging its said fuel spray into said delivery duct immediately adjacent the entry of said delivery duct to said cylindrical part of said small cyclone.

The minor part of said heated air is supplied tangentially via delivery ducts 9 to cylindrical parts 24 of said small cyclones where its heat acts to evaporate fuel discharged by said fuel injectors. The flow of heated air through each said small cyclone generates a sustained vortex of high velocity which causes thorough mixing of said air and fuel vapour within said small cyclones. The resultant vortex fuel-air mixture is discharged into the appropriate said inlet manifold runner (via delivery means or augmentor means, as appropriate) upstream of the associated inlet port 12 and inlet valve 6. Mounting flange 15 of said inlet manifold runner is fixed to cylinder head 13 by suitable fastenings 14 (positions indicated in broken line) and the induction airflow is regulated by butterfly throttle valve 16 turning on shaft 17 rotationally supported in suitable bearings 18 provided in inlet manifold casting 5. In alternative embodiments (not shown), other forms of throttle valve are employed, such valve forms being well known in the art. Said heated fuel spray discharge 10 occurring in atomised form (general pattern indicated in broken line) enters said vortices of heated air in said small cyclones where the greater part undergoes flash evaporation. The process affecting the atomised fuel in said small cyclones is a very complex one involving high velocities, aggressive pressure changes, shearing, turbulence and mixing combined with heat transfer from the air and metal surfaces and no attempt will be made to describe it in detail. However, said process is very effective in producing flash evaporation and any part of said fuel spray discharge not immediately evaporated is centrifuged onto the hot walls of said small cyclones by the high centrifugal forces imposed upon it, forming a thin film which describes a shallow spiral path, taking up heat from the cyclone wall and rapidly evaporating. The actual amount of heat required to effect rapid and complete evaporation varies with the type of fuel and the ratio of mass flow of air and mass flow of fuel through said small cyclones. In an alternative embodiment (not shown) the inner surface of the conical part of said small cyclones is made with a sawtooth longitudinal cross-sectional shape and, in passing over the edges of said sawtooth shape, said fuel thin film is more effectively entrained in said vortex airflow. In the preferred embodiment, said small cyclones are provided with suitable insulation on their external surfaces to minimise loss of heat. The term, 'small cyclones', is intended to indicate simply that the diameter of the cylindrical part of said cyclones is small in relation to the diameter of the bore of the cylinder with which a said small cyclone is related. Typically, the ratio of the two said diameters is in the range 1:10 to 1:2, but variations of ±20% from the stated ratio range may occur. Also typically, the ratio of the length of conical section 23 to the diameter of cylindrical section 24 ranges from less than 0.5:1 to greater than 6:1.

Said vortex fuel-air flow passes to said inlet manifold runner via delivery duct 7 connected to the small end of the conical part of said small cyclones and debouches through outlet 19 to combine and mix with said heated induction airstream before flowing to the cylinders of said engine, effectively as a dry homogenous, gas. The high energy of said vortex fuel-air flow discharged through said outlet acts to promote rapid mixing with said induction airflow in said inlet manifold runner. Delivery duct 7 is made of suitable length and is fixed to boss 8 of inlet manifold casting 5. Said small cyclones are optionally positioned in any suitable attitude with said delivery ducts shaped accordingly. Fuel injectors 2 are accommodated in the normal way in mounting collars 22 provided at the cylindrical ends of said small cyclones, said mounting collars being positioned collinear with the longitudinal axes of said small cyclones. To prevent overheating of said fuel injectors, in the preferred embodiment, coolant jackets 20 are provided around said mounting collars, coolant from the cooling system of said engine being supplied through supply ducts 21 and returned through return ducts (obscured). In an alternative embodiment (not shown), said coolant jackets are deleted, said mounting collars are made suitably larger in diameter and a layer of suitable thermal insulation material is provided between said mounting collars and said fuel injectors. In the preferred form of said alternative embodiment, said thermal insulation material is PSZ ceramic. Obviously, the rate of heat dissipation from said coolant jackets may be increased simply by enlarging their surface area through the provision of finning or the like.

In an alternative embodiment (not shown), simple discharge means in the form of a short extension of outlet 19 projecting for a suitable distance into inlet manifold runner 11 are employed to better distribute said vortex fuel-air flow into said induction airflow. With reference to FIG. 5, in another alternative embodiment, said vortex fuel-air flow is discharged into inlet manifold runner 11 via more complex discharge means. In this embodiment, extension 31 of outlet 19 turns through a suitable angle to bring it parallel to the axis of inlet manifold runner 11 and streamlined fairing 32 is provided around said parallel part to improve flow efficiency. Said vortex fuel-air flow debouches through outlet 33 at the downstream end of said fairing. In the preferred embodiment, extension 31 is made with a streamlined cross-sectional shape to further improve flow efficiency. With reference to FIG. 6, in a further alternative embodiment, said vortex fuel-air flow is discharged into inlet manifold runner 11 via augmenter means. In this embodiment, enlarged bore 34 of boss 8 of inlet manifold casting 5 sealingly accommodates the downstream end of delivery duct 7. Said delivery duct discharges into outlet 19 which debouches into annular space 35 formed within a circumferential zone of diametral enlargement 36 of inlet manifold casting 5. Cylindrical collar 38 is accommodated in an interference fit within annular recess 37 formed in the inner surface of said inlet manifold casting, the downstream end 39 of said collar being deflected inwardly to create annular discharge port 40 between said collar downstream end and the angled downstream, inner surface 41 of circumferential zone of enlargement 36. In an alternative embodiment, angled shoulder 45 is provided immediately downstream of annular discharge port 40 and cylindrical collar 46 is accommodated against said angled shoulder in an interference fit in the bore of inlet manifold casting 5. The upstream end of said collar 44 is deflected through an obtuse angle to bring it more or less into parallel with downstream end 39 of collar 38. In the preferred embodiment, outlet 19 debouches tangentially into annular space 35. In an alternative embodiment, outlet 19 debouches radially into said annular space. Obviously, the width of annular discharge port 40 may be adjusted by changing the length of cylindrical collar 38, by displacing it axially or by changing the angles of any of cylindrical collar end 39, cylindrical collar upstream end 44 and surface 41. In the preferred embodiment, the internal diameter of said inlet manifold runner 11 downstream of annular discharge port 40 is made larger than the internal diameter of the upstream part. In other embodiments, said diameters are more or less equal. In a preferred embodiment, to promote mixing of said vortex fuel-air flow with said induction airflow, a series of closely-spaced, circumferential holes 42, 43 is provided in downstream end 39 of cylindrical collar 38 and upstream end 44 of cylindrical collar 46. In other alternative embodiments for the same purpose, the free edges of downstream end 39 of cylindrical collar 38 and upstream end 44 of cylindrical collar 46 are made castellated, indigitated, sinusoidal or sawtoothed. In a further alternative embodiment for the same purpose, downstream end 39 of cylindrical collar 38 and upstream end 44 of cylindrical collar 46 are made with spirally-arranged fluting or finning to promote rotation of the airflow downstream of said augmenter means.

In the preferred embodiment, said heat exchange means in which said air is heated take the form of a suitable muff (not shown) formed around part of the exhaust manifold or exhaust pipe of said engine. Said muff sealingly encloses said part of the exhaust manifold or exhaust pipe and is supplied with a flow of ambient air via air cleaning means of normal arrangement. In an alternative embodiment (not shown), said heat exchange means take the form of a separate heat exchanger which receives a flow of exhaust gas diverted from the exhaust system and a flow of ambient air via air cleaning means of normal arrangement. In an alternative embodiment (not shown), said small cyclones are provided with a flow of exhaust gas diverted from the exhaust system. In another alternative arrangement (not shown), said small cyclones receive a flow of hot air diverted from the turbo-charger of said engine. In all cases, said heated airflow first passes to a thermally-insulated distribution manifold and thence via separate delivery ducts 9 to said small cyclones. Suitable valve means (not shown) provided in said distribution manifold are operated in synchronisation with throttle movement to increase the flow of heated air to said small cyclones as power is increased and reduce said flow of heated air as power is reduced.

In an alternative embodiment (not shown), said individual small cyclones are deleted and one or more larger cyclones are employed to provide said vortex fuel-air flow to individual inlet manifold runners.

Figure 3:
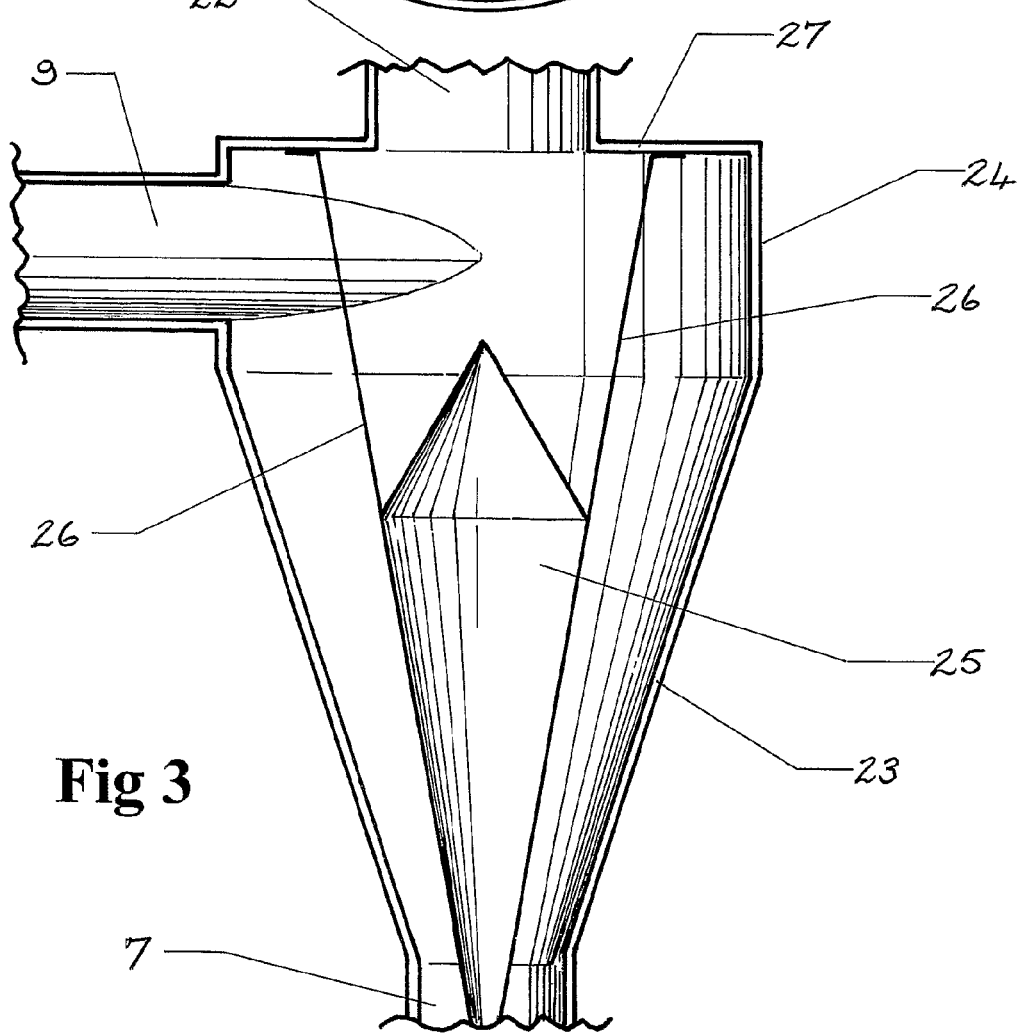
FIG. 3 is a longitudinal cross-sectional view through an alternative embodiment of small cyclone.

With reference to FIG. 3, in another alternative embodiment, to prevent the migration of the least dense flow component (air unmixed with fuel and entrained fuel droplets) into the core of a said vortex in a said small cyclone, a bullet 25 of streamlined shape is supported coaxially within the tapered part 23 of said cyclone by two or more strong, narrow struts 26 fixed to the inner surface of the upper wall 27 of said cyclone. Said struts exert a minimal effect upon development of said vortex flow.

During starting from cold, the flow of liquid fuel impinging upon the inner surfaces of said small cyclones acts to remove any accumulated material from said surfaces.

Figure 4:
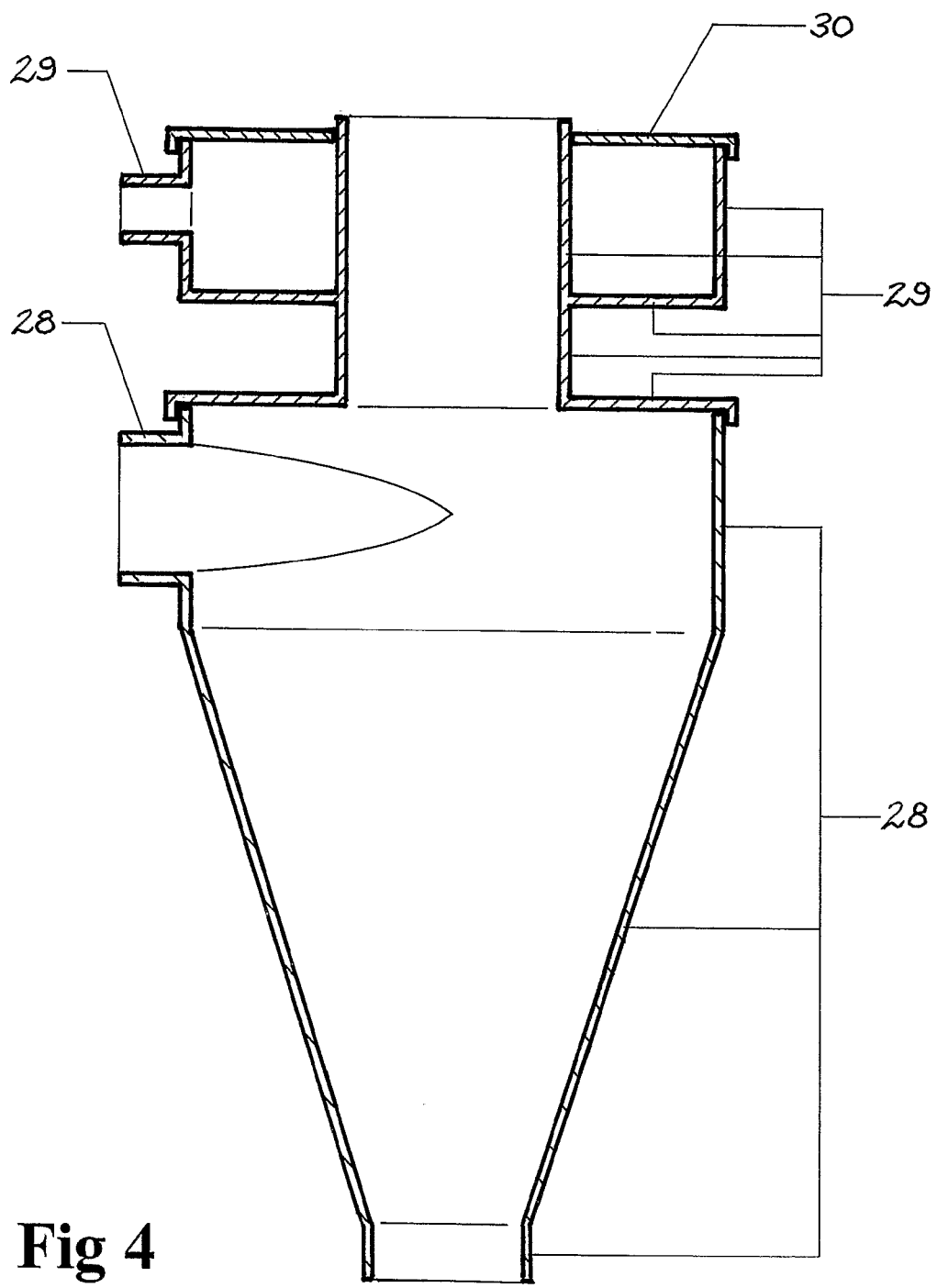
FIG. 4 is a longitudinal cross-sectional view through a small cyclone showing typical construction and assembly.

With additional reference to FIG. 4, in the manufacturing of said small cyclones, in the preferred embodiment, cylindrical part 24, stub for attachment of delivery duct 9, conical part 23 and stub for attachment of delivery duct 7 are made in one piece (assembly depicted as 28); fuel injector mounting collar 22, upper wall of said cyclone 27, lower wall of said coolant jacket, cylindrical part of said coolant jacket and stubs for attachment of coolant supply duct 21 and said coolant return duct are made in one piece (assembly depicted as 29); and the upper wall of said coolant jacket is made in one piece (depicted as 30). In the preferred embodiment, said components are sealingly joined by furnace brazing, silver soldering or other suitable welding process.

In an alternative embodiment (not shown), said small cyclones are employed in the manner described to mix a gaseous fuel with an induction airstream and to condition the resultant mixture. Said gaseous fuel may be propane, butane, methane, hydrogen or the like and may be discharged into said small cyclones in gaseous or liquid form.

In another alternative embodiment (not shown), a plurality of said small cyclones discharge their said vortex fuel-air flow tangentially into one or more larger cyclones wherein said fuel-air flow is conditioned before flowing to the cylinders of an engine.

In another embodiment (not shown), the axis of a said fuel injector is displaced from collinearity with the axis of its associated said small cyclone, both said axes remaining in parallel arrangement.

In another alternative embodiment (not shown), the axis of a said fuel injector is displaced radially and in an angular sense from the axis of its associated said small cyclone.

With further reference to FIG. 1, in another alternative embodiment (not shown), in the zone of delivery duct 9 approaching and entering cylindrical part 24 of small cyclone 4, the regular cross-sectional shape of said duct is smoothly transformed into an elongate cross-sectional shape, the major axis of which is disposed axially, circumferentially or in any intermediate disposition in relation to said cylindrical part.

With reference again to FIG. 1, obviously delivery duct 7 may be fixed to a suitable boss formed on cylinder head 13 and discharge directly into inlet port 12. Also obviously, delivery duct 7 may be deleted and the outlet from said small cyclone connected directly to boss 8.

In operation, a microprocessor-based fuel control unit (not shown) integrates data from sensors of engine operating parameters, including RPM, RPM trend, throttle position, manifold air pressure and cylinder head temperature, together with ignition advance mapping data, the position of said valve means regulating the flow of heated air to said small cyclones, the temperature of induction air and the temperature of the heated fuel and regulates the volume of fuel discharged from said fuel injectors accordingly.

To minimise heat loss, any exposed metal surface of the present invention is optionally coated on external or internal surfaces, as appropriate, with a suitable thermal insulation material. Such surfaces include, but are not limited to said conduits carrying heated fuel or air, said small cyclones, said inlet manifold casting and the interior of said annular space (depicted as 35 in FIG. 6).

Temperature values, dimensions, ratios and the like provided herein are indicative and should not be taken to limit the scope of the present invention.

The benefits of the present invention, where fully realised, are the achievement of reliable ignition during all phases of engine operation using leaner than normal mixtures, no reduction in power output, improved fuel economy and reduction of pollutants in the exhaust gas stream.

The invention claimed is:

1. An apparatus constituting part of an induction and fuel delivery system for a cylinder of a piston internal combustion engine, said apparatus comprising:
    a cyclone into which is tangentially discharged a flow of heated air to generate a sustained vortex of high rotational speeds;
    a modulatable fuel injector delivering a flow of atomized fuel into said cyclone wherein it underdoes flash evaporation and energetic mixing;
    a delivery duct connecting said cyclone to an inlet tract of said cylinder wherein a vortex fuel-air mixture is mixed with induction air; and
    means to prevent overheating of said modulatable fuel injector.

2. The apparatus according to claim 1 in which said cyclone comprises:
    a cylindrical part;
    a conical part joined to said cylindrical part;
    an upper wall closing said cylindrical part, said upper wall supporting means for mounting said modulatable fuel injector and having an aperture through which said flow of atomized fuel is discharged;
    a tangentially-arranged inlet to said cylindrical part through which said flow of heated air is delivered; and
    an outlet at the apex of said conical part joined to said delivery duct.

3. The apparatus according to claim 2 in which a downstream end of said delivery duct is fixed to a boss formed on an inlet manifold runner casting associated with said cylinder and said vortex fuel-air mixtures debouches into said inlet tract via an outlet passing through said boss.

4. The apparatus according to claim 2 in which said cyclone is supported in any attitude and said delivery duct is shaped accordingly.

5. The apparatus according to claim 2 in which said cyclone is mounted directly to said boss of said inlet manifold runner casting.

6. The apparatus according to claim 3 in which said boss is formed on a cylinder head and said outlet discharges into an inlet port of said cylinder head.

7. The apparatus according to claim 2 in which a ratio of a diameter of said cylindrical part of said cyclone to a diameter of a bore of its associated engine cylinder is typically in a range 1:10 to 1:2 with variations of +−0.20% occurring.

8. The apparatus according to claim 2 in which a ratio of a length of said conical section of said cyclone to a diameter of its said cylindrical section is typically in a range of less than 0.5:1 through to greater than 6:1.

9. The apparatus according to claim 2 in which an inner surface of said conical part of said cyclone is made with a sawtooth longitudinal cross-sectional shape to promote entrainment in said vortex fuel-air flow of fuel film passing over said inner surface.

10. The apparatus according to claim 2 in which the cylinders of an engine are supplied with said vortex fuel-air flow from one or more larger cyclones.

11. The apparatus according to claim 2 in which a bullet of streamlined shape is supported within said cyclone and coaxially with it to prevent migration of less dense components of said fuel-air mixture to a core of said vortex formed within said cyclone.

12. The apparatus according to claim 2 in which said cyclone comprises:
    said cylindrical part, stub for attachment of tangential inlet, said conical part and a stub for attachment of said delivery duct, all made as a first assembly of one or more pieces;
    fuel injector mounting means, said upper wall of said cyclone, lower wall of a coolant jacket, cylindrical part of said coolant jacket and stubs for attachment of coolant supply and return ducts, all made as a second assembly of one or more pieces;
    upper wall of said coolant jacket;
    said first assembly and said second assembly being sealingly joined by one selected from the group consisting of furnace brazing, silver soldering, and other suitable welding process.

13. The apparatus according to claim 1 in which said means to prevent overheating of said modulatable fuel injector is a coolant jacket formed around means for mounting said modulatable fuel injector, said coolant jacket receiving a continuous supply of coolant from a cooling system of the engine.

14. The apparatus according to claim 1 in which said means to prevent overheating of said modulatable fuel injector is a layer of thermal insulation material between said modulatable fuel injector and its said mounting means.

15. The apparatus according to claim 14 in which said thermal insulation material is PSZ ceramic.

16. The apparatus according to claim 13 in which a rate of heat dissipation from said coolant jackets is increased by enlarging a surface area of said coolant jacket by way of finning.

17. The apparatus according to claim 1 in which said fuel is a liquid fuel that is a liquid in a temperature range of 20° C. to 300° C.

18. The apparatus according to claim 1 in which said air includes at least one gas in admixture with oxygen.

19. The apparatus according to claim 1 in which said fuel is heated to an approximate temperature of 85° C. to 90° C.

20. The apparatus according to claim 19 in which said fuel is heated in thermostatically-controlled heat-exchange means using engine waste heat.

21. The apparatus according to claim 1 in which said modulatable fuel injector has a discharge axis positioned collinear with a longitudinal axis of said cyclone.

22. The apparatus according to claim 1 in which said modulatable fuel injector has a discharge axis positioned parallel to but laterally displaced from a longitudinal axis of said cyclone, including being mounted on and discharging a fuel spray into said delivery duct immediately adjacent an entry of said delivery duct to a cylindrical part of said cyclone.

23. The apparatus according to claim 1 in which said modulatable fuel injector has a discharge nozzle positioned on or close to a longitudinal axis of said cyclone, and angularly displaced from said cyclone.

24. The apparatus according to claim 1 in which said modulatable fuel injector has a discharge nozzle displaced laterally from a longitudinal axis of said cyclone, and has a discharge axis displaced in an angular sense from said longitudinal axis of said cyclone.

25. The apparatus according to claim 1 in which said induction air is heated.

26. The apparatus according to claim 25 in which a flow of air is heated in heat-exchange means by engine waste heat to a temperature of up to 1,000° C. and a greater part of said flow is mixed with ambient air to provide a supply of heated induction air.

27. The apparatus according to claim 26 in which said heat-exchange means is a muff sealingly enclosing part of one of an exhaust manifold, and exhaust pipe of the engine, said muff receiving a flow of ambient air via air cleaning means.

28. The apparatus according to claim 26 in which said heat-exchange means is a separate heat exchanger receiving a flow of exhaust gas diverted from an engine exhaust system and a flow of ambient air via air cleaning means.

29. The apparatus according to claim 26 in which said air from said heat-exchange means is mixed with ambient air in a modulatable, electronically-controlled mixing valve to maintain the induction air temperature in the range of 20° C. to 100° C.

30. The apparatus according to claim 26 in which said air from said heat-exchange means is mixed with ambient air in a modulatable, electronically-controlled mixing valve to maintain the induction air temperature above the dew point of a fuel being used.

31. The apparatus according to claim 30 in which external surfaces of said heat exchange means, ducting conveying said heated air, said mixing valve and an inlet manifold are clad with suitable thermal insulation material.

32. The apparatus according to claims 29 or 30 in which signals from sensors sensing temperature of said air from said heat exchange means, temperature of ambient air and temperature of the mixed airstream and a position of valving elements of said mixing valve are processed in a microprocessor-based control unit which modulates an position of said valving elements.

33. The apparatus according to claim 1 in which a flow of air is heated in heat-exchange means by engine waste heat to a temperature of up to 1,000° C. and a minor part of said flow is directed to said cyclone.

34. The apparatus according to claim 1 in which said flow of air to said cyclone is supplied from a turbo-charger.

35. The apparatus according to claim 1 in which said cyclone is provided with a flow of diverted, hot exhaust gas.

36. The apparatus according to claim 1 in which said flow of heated air is supplied to said cyclone via a distribution manifold, said distribution manifold, said cyclone and said delivery duct being insulated externally to minimize heat loss.

37. The apparatus according to claim 36 in which valve means provided in said distribution manifold are operated in synchronization with throttle movement to modulate the flow of heated air to said cyclones in accordance with throttle position.

38. The apparatus according to claim 2 in which said vortex fuel-air mixture is discharged into said inlet tract via delivery means or augmentor means.

39. The apparatus according to claim 38 in which said delivery means is an extension of said outlet projecting at an angle into said inlet tract.

40. The apparatus according to claim 38 in which said delivery means of a longer is an extension of said outlet into said inlet tract, a downstream part of said extension being positioned coaxial with said inlet tract and enclosed in a streamlined fairing.

41. The apparatus according to claim 40 in which an unfaired part of said outlet exposed to induction airflow within said inlet tract has a streamlined cross-sectional shape.

42. The apparatus according to claim 38 in which said augmentor means is an annular space in said inlet tract into which said vortex fuel-air mixture is discharged, said annular space being defined by an outward bulging of said inlet manifold runner casting and a first cylindrical collar installed in the bore of said inlet tract, discharge of said vortex fuel-air mixture from said annular space occurring through an annular discharge port defined by complementary parts of said first cylindrical collar and a second cylindrical collar installed in the bore of said inlet tract downstream of said first cylindrical collar, said complementary parts being angled in the direction of induction airflow.

43. The apparatus according to claim 42 in which said vortex fuel-air flow enters said annular space tangentially.

44. The apparatus according to claim 42 in which said vortex fuel-air flow enters said annular space radially.

45. The apparatus according to claim 42 in which said angled complementary parts of said cylindrical collars are provided with a plurality of closely-spaced, circumferentially-arranged holes to promote mixing of said vortex fuel-air flow with said induction air.

46. The apparatus according to claim 42 in which free, downstream edges of said angled complementary parts are made as one selected from the group consisting of castellated, indigitated, sinusoidal, and sawtoothed to promote mixing of said vortex fuel-air flow with said induction air.

47. The apparatus according to claim 42 in which said angled complementary parts are made with one of spirally-arranged fluting, and finning to promote rotation of the airflow downstream of said augmentor means.

48. The apparatus according to claim 42 in which an effective diameter of said inlet tract is increased downstream of said augmentor means.

49. The apparatus according to claim 42 in which an effective width of said annular discharge port is adjusted by one of repositioning one of said first cylindrical collar and said second cylindrical collar, one to another, and by changing angles of said angled complementary parts respectively.

50. The apparatus according to claim 42 in which interior surfaces of said annular space are coated with a thermal insulation material.

51. The apparatus according to claim 2 in which said cyclone is used to mix a gaseous fuel with heated air.

52. The apparatus according to claim 51 in which said fuel is selected from the group consisting of butane, propane, methane, and hydrogen.

53. The apparatus according to claim 2 in which a plurality of said cyclones discharge said vortex fuel-air flow tangentially into one or more larger cyclones in which said fuel-air flow is conditioned before flowing to the cylinders of an engine.

54. The apparatus according to claim 2 in which a microprocessor-based fuel control unit integrates data from sensors of engine operating parameters, including RPM, RPM trend, throttle position, manifold air pressure and cylinder head temperature, position of said valve means regulating the flow of heated air to said cyclones, the temperature of induction air and the temperature of the heated fuel, together with ignition advance mapping data, and regulates the volume of fuel discharged from said fuel injectors accordingly.

55. The apparatus according to claim 1 in which said vortex fuel-air mixture is delivered to said inlet tract effectively as a dry, homogenous gas.

56. The apparatus according to claim 1 in which said modulatable fuel injector delivers a flow of atomized fuel into said cyclone wherein it undergoes flash evaporation and energetic mixing, any unevaporated fuel component being centrifuged onto internal wall surfaces of said cyclone and thereby evaporating by a taking up of heat.

57. A method of providing fuel-air mixture to a cylinder of a piston internal combustion engine, said method comprising the steps of:
tangentially discharging a flow of heated air into a cyclone to generate therein a sustained vortex of high rotational speed;
delivering from a modulatable fuel injector a flow of heated, atomized fuel into said cyclone wherein it underdoes flash evaporation and energetic mixing; and
discharging said vortex fuel-air flow via a delivery duct into an inlet tract of said cylinder wherein said vortex fuel-air mixture is mixed with heated induction air.

58. The method according to claim 57 in which a flow of air is heated in heat-exchange means by engine waste heat to a temperature of up to 1,000° C., a greater part of said flow being mixed with ambient air to provide a supply of heated induction air.

59. The method according to claim 57 in which the cylinders of an engine are supplied with said vortex fuel-air flow from one or more larger cyclones.

60. The method according to claim 57 in which said fuel includes any liquid fuel capable of being treated in the manner claimed, including fuels which are liquid only in the temperature range of 20° C. to 300° C.

61. The method according to claim 57 in which said air includes at least one gas in admixture with oxygen.

62. The method according to claim 57 in which said fuel is heated in thermostatically-controlled heat-exchange means using engine waste heat to an approximate temperature of 85° C. to 90° C.

63. The method according to claim 58 in which said air from said heat-exchange means is mixed with ambient air in a modulatable, electronically-controlled mixing valve to maintain the induction air temperature in the range of 20° C. to 100° C.

64. The method according to claim 57 in which a flow of air is heated in heat-exchange means by engine waste heat to a temperature of up to 1,000° C., the minor part of said flow being directed to said cyclone.

65. The method according to claim 57 in which said flow of heated air to said cyclone is supplied from a turbo-charger.

66. The method according to claim 57 in which said cyclone is provided with a flow of diverted, hot exhaust gas.

67. The method according to claim 57 in which valve means in a distribution manifold connected to said cyclone are operated in synchronization with throttle movement to modulate the flow of heated air to said cyclone in accordance with throttle position.

68. The method according to claim 57 in which said cyclone is used to mix a gaseous fuel with heated air, said gaseous fuel is selected from the group consisting of butane, propane, methane, and hydrogen.

69. The method according to claim 57 in which a plurality of said cyclones discharge said vortex fuel-air flow tangentially into one or more larger cyclones in which said fuel-air flow is conditioned before flowing to the cylinders of an engine.

70. The method according to claim 57 in which a microprocessor-based fuel control unit integrates data from sensors of engine operating parameters, including RPM, RPM trend, throttle position, manifold air pressure and cylinder head temperature, the position of said valve means regulating the flow of heated air to said cyclones, the temperature of induction air and the temperature of the heated fuel, together with ignition advance mapping data, and regulates the volume of fuel discharged from said fuel injectors accordingly.

71. The method according to claim 57 in which said vortex fuel-air mixture is delivered to said inlet tract effectively as a dry, homogenous gas.

72. The method according to claim 57 in which said cyclone comprises a cylindrical part joined to a conical part.

73. The method according to claim 72 in which a ratio of a diameter of said cylindrical part of said cyclone to a diameter of a bore of an associated engine cylinder is in a range of 1:10 to 1:2 with variations of +−20% occurring.

74. The method according to claim 72 in which a ratio of a length of said conical part of said cyclone to a diameter of said cylindrical part is in a range of less than 0.5:1 through to greater than 6:1.

75. The method according to claim 57 in which said modulatable fuel injector delivers a flow of atomized fuel into said cyclone wherein it undergoes flash evaporation and energetic mixing, any unevaporated fuel component being centrifuged onto internal wall surfaces of said cyclone and thereby evaporating by taking up of heat.

\* \* \* \* \*